United States Patent [19]

Carlson et al.

[11] Patent Number: 4,599,386
[45] Date of Patent: Jul. 8, 1986

[54] HEAT STABLE TETRAFLUOROETHYLENE-PER-FLUORO(ALKYL VINYL ETHER) COPOLYMERS

[75] Inventors: Dana P. Carlson, Chadds Ford, Pa.; Dewey L. Kerbow, Vienna, W. Va.; Thomas J. Leck, Orange, Tex.; Allan H. Olson, Parkersburg, W. Va.

[73] Assignee: E. I. Du Pont de Nemours and Company, Wilmington, Del.

[21] Appl. No.: 662,064

[22] Filed: Oct. 18, 1984

[51] Int. Cl.$^4$ .............................................. C08F 15/02
[52] U.S. Cl. .................................. 525/326.2; 525/378
[58] Field of Search .............................. 525/378, 326.2

[56] References Cited

U.S. PATENT DOCUMENTS 3,085,083  4/1963  Schreyer .
3,642,742  2/1972  Carlson .
4,126,589  11/1978 Hamada et al. .................. 525/326.2
4,138,373  2/1979  Ukihashi et al. ...................... 521/38
4,208,455  6/1980  Giuffre et al. ...................... 427/341
4,276,214  6/1981  Yoshimura et al. .
4,434,273  2/1984  Uschold ........................... 525/326.2
4,493,910  1/1985  Tighe et al. ......................... 523/108
4,503,206  3/1985  Robinson .......................... 526/255

FOREIGN PATENT DOCUMENTS 1210794  10/1970  United Kingdom .

Primary Examiner—John Kight
Assistant Examiner—M. L. Moore

[57] ABSTRACT

A tetrafluoroethylene-perfluoro(alkyl vinyl ether) copolymer in which heat unstable carbinol end-groups (—CH$_2$OH groups) present have been protected against heat degradation by treating the copolymer with NH$_3$ or NH$_3$ producing compounds.

3 Claims, No Drawings

HEAT STABLE TETRAFLUOROETHYLENE-PERFLUORO(ALKYL VINYL ETHER) COPOLYMERS

FIELD OF THE INVENTION

This invention relates to tetrafluoroethylene-perfluoro(alkyl vinyl ether) copolymers (TFE/FAVE copolymers) in which heat unstable carbinol end-groups ($-CH_2OH$ groups) present have been protected against heat degradation.

BACKGROUND OF THE INVENTION

It had earlier been discovered that when tetrafluoroethylene (TFE) and perfluoro(alkyl vinyl ethers) (FAVE) are copolymerized in the presence of organic halocarbon solvents certain properties of the resulting copolymer are enhanced when alcohols, such as methanol, are added to the reaction mixture. The properties enhanced include reduced die swell on extrusion and improved flex life. The advantages of using such alcohols are described in U.S. Pat. No. 3,642,742.

The alcohol acts as a chain transfer agent, i.e., it stops chain propagation by reacting with free radical end groups of the growing polymer chain. This reaction of alcohol with free radical ends results in a polymer that has carbinol, i.e., $-CH_2OH$, end groups. While these carbinol groups are relatively stable, it has been found that TFE/FAVE copolymers sometimes need to be annealed, i.e., heated to high temperatures after molding into molded articles, in order to impart good dimensional stability to the molded articles. However, the high temperatures used during annealing in an ambient atmosphere cause the carbinol, $-CH_2OH$, end groups to decompose to acid fluoride, $-COF$, groups. These acid fluoride end groups then hydrolyze to carboxyl, $-COOH$, groups with evolution of hydrogen fluoride (HF). HF is a reactive, corrosive acid and its presence causes difficulties in moled articles derived from TFE/FAVE copolymers that contain the original $-CH_2OH$ end groups. In addition, the $-COOH$ groups degrade on fabrication of the polymer to produce gases ($CO_2$) that produce undesirable bubbles in molded articles.

The raw polymer, as made, contains some $-COF$ and $-COOH$ end-groups and these decompose also, along with the $-COF$ and $-COOH$ groups formed from decomposition of the $-CH_2OH$ end-groups.

SUMMARY OF THE INVENTION

In an effort to reduce the number of $-COF$ and $-COOH$ end-groups, it has now been discovered that those groups present in the raw polymer, as made, can be converted to amide end-groups. It has also now been discovered that this conversion to amide groups of the original $-COF$ and $-COOH$ end-groups surprisingly imparts thermal stability to the $-CH_2OH$ end-groups and retards their decomposition. Accordingly, this invention is directed to a means for stabilizing the carbinol ($-CH_2OH$) end groups to retard their decomposition to $-COF$ groups and, in turn, the breakdown of the $-COF$ groups to form corrosive HF and undesirable $-COOH$ end groups. The stabilizing means is not completely known or understood, but it has now been found that when TFE/FAVE copolymers containing $-CH_2OH$, $-COF$ and $-COOH$ end groups (which are conveniently made in the presence of halocarbon solvents and an alcohol) are treated with nitrogen-containing compounds such as ammonia or ammonia-producing compounds such as ammonium salts or organic amines, the resulting material has enhanced propensity against heat-degradation of the carbinol groups. These nitrogen-containing compounds react with $-COF$ and $-COOH$ end-groups present in the polymer to form amide end groups, i.e., $-CONH_2$ groups.

DETAILED DESCRIPTION OF THE INVENTION

The copolymer to be protected from thermal degradation is conveniently made by reacting tetrafluoroethylene (TFE) and at least one perfluoro(alkyl vinyl ether) (FAVE) containing 3 to 10 carbon atoms, i.e. $R_f-O-CF=CF_2$ where $R_f$ is perfluoroalkyl of 1-8 carbon atoms in the presence of a halocarbon solvent and a 1-3 carbon alcohol present as a transfer agent. The resulting copolymer contains $-CH_2OH$, $-COOH$, and $-COF$ end groups. Typically, $-CH_2OH$ end-groups will be present in an amount of at least 15 groups, preferably at least 20, more preferably at least 30 and most preferably at least 40 groups, per $10^6$ carbon atoms; and $-COF$ and $-COOH$ groups will be present in a combined amount of at least 15 groups, preferably at least 30, and more preferably at least 40 groups, per $10^6$ carbon atoms. The copolymers generally will contain 0.5 to 20% (by weight) FAVE units and generally will have a melt viscosity of between $1\times10^4$ poise and $35\times10^4$ poise at 372° C. The preparation of these copolymers is described in U.S. Pat. No. 3,642,742. Suitable solvents include chlorofluoroalkanes of 1-4 carbons and preferable of 1-2 carbons. Suitable alcohol chain transfer agents include alcohols of 1-3 carbon atoms, e.g., isopropanol, propanol, ethanol and preferably methanol. In addition, the copolymers can contain minor amounts, e.g. up to 15% by weight, of other copolymerizable comonomer units, e.g. hexafluoropropylene units.

To treat these copolymers with nitrogen compounds to convert the $-COF$ and $-COOH$ groups to amide groups, the copolymer is simply contacted with the nitrogen compound. Ammonia vapor is the preferred nitrogen compound and it can be simply passed into a closed container containing the copolymer for a desired amount of time or can be passed over or through a bed of the copolymer for a desired amount of time. The copolymer can be agitated during contact if desired. The form of the copolymer is not important; it can be in flake, cube, pellet or article form. The atmosphere in the container can be 100% $NH_3$ or can be as little as 0.1% by volume $NH_3$ (with the remainder being air or inert gases). In dilute form, 1-30% by volume is preferred and 10-30% most preferred. Contact time is long enough to achieve the desired degree of conversion to amide end groups, usually at least 50%, and preferably about 100%. The time is usually between ½ to 24 hours, with 1 to 7½ hours preferred and 2 to 6 hours most preferred. Temperature and pressure are not critical. Pressure is usually atmospheric, for convenience. Temperature is usually room temperature, 20°-30° C., but can be between 0° and 100° C. Usually when —COOH groups are to be converted to amide groups, higher temperatures are used.

When ammonia-forming ammonium salts or organic amines are used, the copolymer is ordinarily melted in contact with the nitrogen compound. A convenient means is to extrude the molten copolymer and the nitrogen compound. Among the nitrogen compounds that can be employed in this manner are

| Ammonium carbonate | $(NH_4)_2CO_3$ |
|---|---|
| Ammonium bicarbonate | $NH_4HCO_3$ |
| Ammonium carbamate | $NH_4CO_2NH_2$ |
| Urea | $NH_2CONH_2$ |
| Guanidine carbonate | $(NH_2)_2(C=NH)H_2CO_3$ |
| Ammonium oxalate | $(NH_4)_2C_2O_4$ |
| Ammonium sulfamate | $NH_4SO_3NH_2$ |
| Ammonium formate | $NH_4HCO_2$ |
| Ammonium thiocyanate | $NH_4SCN$ |
| Ammonium sulfate | $(NH_4)_2SO_4$ |
| Ammonium phosphate - Diabasic | $(NH_4)_2HPO_4$ |
| Biuret | $NH_2-CO-NH-CO-NH_2$ |

The amount of the nitrogen compound present in this melt contact can be 0.01-0.5% by weight of copolymer. The melt temperatures can be 320°-370° C., and the contact times can be 2-30 minutes.

Regardless of the nitrogen compound used, the resulting copolymer is one in which —COF and —COOH end groups present originally have been converted to —CONH$_2$ groups. Thus the treated copolymer contain less than half the —COF and —COOH groups originally present and preferably will contain substantially no such groups. Conversely, the treated copolymer will contain an amount of —CONH$_2$ groups approximately equal to or greater than the combined number of —COF and —COOH groups. Ordinarily there will be at least 20 —CONH$_2$ groups present per $10^6$ carbon atoms, and sometimes 30 or 40 or more such groups.

The hydrolytic instability of raw TFE/FAVE copolymers is easily demonstrated by immersing the copolymer in water and measuring the amount of fluoride ions extracted into the water. Typically, raw copolymer will liberate 20 ppm or more F$^-$ ions based on weight of copolymer, whereas the treated copolymer liberates less than 5 ppm F$^-$, and preferably less than 1.

DESCRIPTION OF MATERIALS AND TEST MEASUREMENTS

A. Polymer End Groups

The type and quantity of certain end groups in the polymer were determined by the infrared spectrum obtained on compression molded films of about 10 mils (0.25 mm) thickness. The end groups of interest and absorbance frequencies are shown below:

| End Group | Absorbance |
|---|---|
| Acid Fluoride (—COF) | 1883 cm$^{-1}$ |
| Carboxylic Acid (m) (—CO$_2$H) | 1810 cm$^{-1}$ |
| Methyl Ester (—CO$_2$CH$_3$) | 1795 cm$^{-1}$ |
| Carboxamide (—CONH$_2$) | 1768 cm$^{-1}$ |

-continued

| End Group | Absorbance |
|---|---|
| Carbinol (—CH$_2$OH) | 3648 cm$^{-1}$ |

The quantitative measurement of the number of these groups was obtained by the measurement of the extinction coefficients of each of these groups from model compounds and transferring these coefficients to the measurements obtained on the polymer. The end groups are expressed as the number per one million carbon atoms in the polymer.

B. Melt Viscosity

The melt viscosity is measured according to ASTM D-1238-52T modified by using a cylinder, orifice and piston tip made of a corrosion-resistant alloy (Haynes Stellite 19), by charging a 5.0 g sample to the 9.53 mm inside diameter cylinder which is maintained at 372° C.±1° C., and by extruding the sample 5 minutes after charging through a 2.10 mm diameter, 8.00 mm long square-edged orifice under a load (piston plus weight) of 5000 g. (This corresponds to a shear stress of 0.457 kg/cm$^2$). The melt viscosity in poises is calculated as 53150 divided by the observable extrusion rate in grams per minute.

C. TFE/PPVE Copolymer

The tetrafluoroethylene/perfluoropropyl vinyl ether copolymer (PPVE) used in these examples was prepared in accordance with U.S. Pat. No. 3,642,742 (Carlson). This patent describes a process for preparing TFE/PPVE copolymers in F-113 solvent, with 3-P initiator, using methanol as a chain transfer agent.

D. Extractable Fluoride Ion Content Test

A 10-20 g sample of the copolymer is treated as follows: one part (by weight) of sample was mixed with one part of H$_2$O:methanol (50/50) and one part total ionic strength activity buffer (cyclohexylene dinitrilo tetraacetic acid) (TISAB, Orion, Cat. No. 94-09-09A). Fluoride ion concentrations were measured after initial aqueous contact and after 18-24 hours contact at ambient temperatures (22°-25° C.) using the fluoride specific ion electrode by direct measurement as described in Orion publication number IM94, 96-09/7721.

EXAMPLE

Example 1

Extrusion pelletized cubes (approx. 1600 lbs, about 2-3 mm in size) of TFE/PPVE Copolymer (of $3.4 \times 10^4$ poise melt viscosity at 372° C. and containing about 3.2 wt% PPVE) were charged to a 32 cu. ft. container (made of polyethylene) and fitted with a gas inlet tube at the bottom and vapor outlet port on the top. The vapor space/cube volume ratio was 1.8. Anhydrous ammonia (approximately 1.5 lbs) was introduced into the vessel through the gas inlet tube over a 15 minute period. The inlet and outlet tubes were then capped and the polymer cubes were allowed to stand in contact with the dilute ammonia atmosphere for a 24 hour period at 22°-25° C. The vessel outlet port was then fitted to an exhaust system while nitrogen was blown through the inlet tube to displace the NH₃ treatment vapor. As shown below, infrared analysis of the polymer end groups before and after ammonia vapor treatment show that the carbonyl fluoride groups were converted to amide groups.

| | END GROUPS NO/10⁶ CARBONS IN | | | | | | | | | |
|---|---|---|---|---|---|---|---|---|---|---|
| TIME-HOURS | RESIN BEFORE NH₃ TREATMENT | | | | | RESIN AFTER NH₃ TREATMENT | | | | |
| AT 295° C. | —COF | —CO₂H | —CO₂CH₃ | —CONH₂ | —CH₂OH | —COF | —CO₂H | —CO₂CH₃ | —CONH₂ | —CH₂OH |
| 0 | 26 | 0 | 39 | 0 | 197 | 0 | 0 | 56 | 36 | 210 |
| 1 | 18 | 9 | 45 | 0 | 152 | 3 | 0 | 47 | 30 | 214 |
| 2 | 19 | 8 | 61 | 0 | 160 | 0 | 0 | 45 | 30 | 211 |
| 4 | 35 | 9 | 49 | 0 | 122 | 0 | 0 | 42 | 38 | 193 |
| 6 | 67 | — | 56 | 0 | 38 | 0 | 0 | 41 | 28 | 198 |
| 8 | 68 | — | — | 0 | 0 | 0 | 0 | 32 | 28 | 168 |

| | Number of End Groups/10⁶C | |
|---|---|---|
| End Group Functionality | Before NH₃ Treatment | After NH₃ Treatment |
| —COF | 26 | 0 |
| —CO₂H | 0 | 0 |
| —CO₂CH₃ | 39 | 56 |
| —CONH₂ | 0 | 36 |
| —CH₂OH | 197 | 210 |

The polymer was tested for fluoride ion extractability both before and after NH₃ treatment. Results were as follows:

| Extractable Fluoride Ion Content | |
|---|---|
| Before NH₃ Treatment | After NH₃ Treatment |
| 22.8 ppm | 1.0 ppm |

Stabilization of the carbinol end groups to heat aging was demonstrated as follows: Samples of the polymers described above, before and after ammonia treatment, were placed in a circulating air oven at 295° C. At the various time intervals shown below, portions of the resin were removed from the oven and analyzed by infrared for end group content. As shown by the results summarized below, the untreated (unamidated) resin steadily lost —CH₂OH end groups and showed an increase in —COF groups as a result of heat aging. The treated resin (amidated) showed essentially no change in end group content under the test conditions.

We claim:

1. A heat-stable melt-processable copolymer of tetrafluoroethylene and at least one perfluoro(alkyl vinyl ether) of the formula

$$R_f\text{—O—CF=CF}_2$$

where $R_f$ is of 1–8 carbon atoms, said copolymer having at least about 8 —CONH₂ end groups per 10⁶ carbon atoms present in the copolymer chain and having at least 15 —CH₂OH end groups per 10₆ carbon atoms, said —CONH₂ end groups also being present in an amount substantially equal to or greater than the amount of any —COF and —COOH end groups present.

2. The copolymer of claim 1 wherein the —CONH₂ end groups present are present in amounts of between 8 and 40 per 10⁶ carbon atoms and the —CH₂OH end groups present are present in amounts between 15 and 210 per 10⁶ carbon atoms.

3. Process for stabilizing a melt-processable copolymer of tetrafluoroethylene and at least one perfluoro(alkyl vinyl ether) of the formula $R_f$—O—CF=CF₂ where $R_f$ is of 1–8 carbon atoms, which copolymer contains between 15 and 210 —CH₂OH end groups per 10⁶ carbon atoms and at least 15 —COF and —COOH end groups per 10⁶ carbon atoms, which comprises contacting the copolymer with NH₃ or a nitrogen-containing compound that produces NH₃ for a time sufficient to convert more than half the —COF and —COOH end groups to —CONH₂ groups.

* * * * *